UNITED STATES PATENT OFFICE.

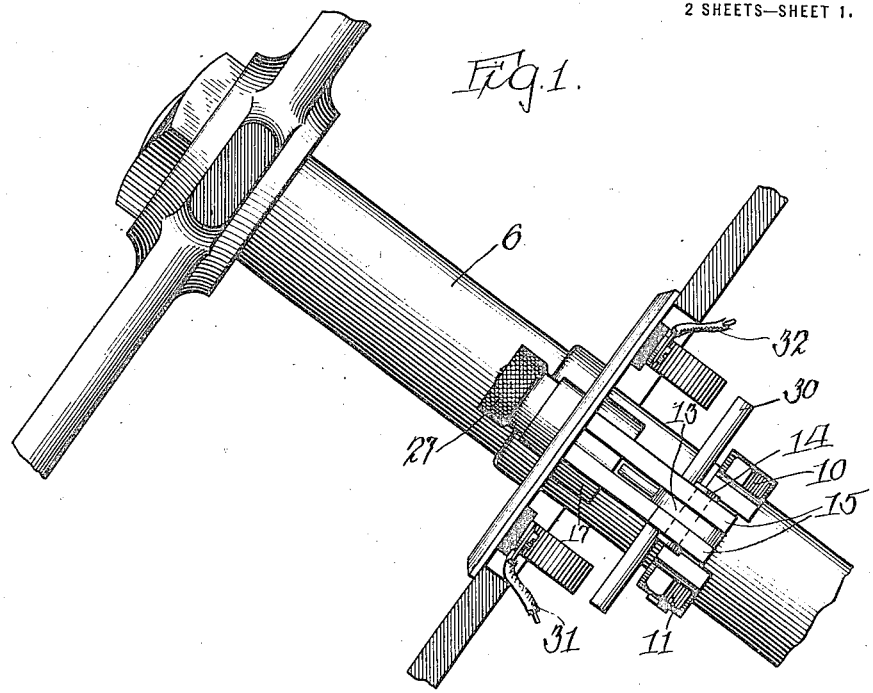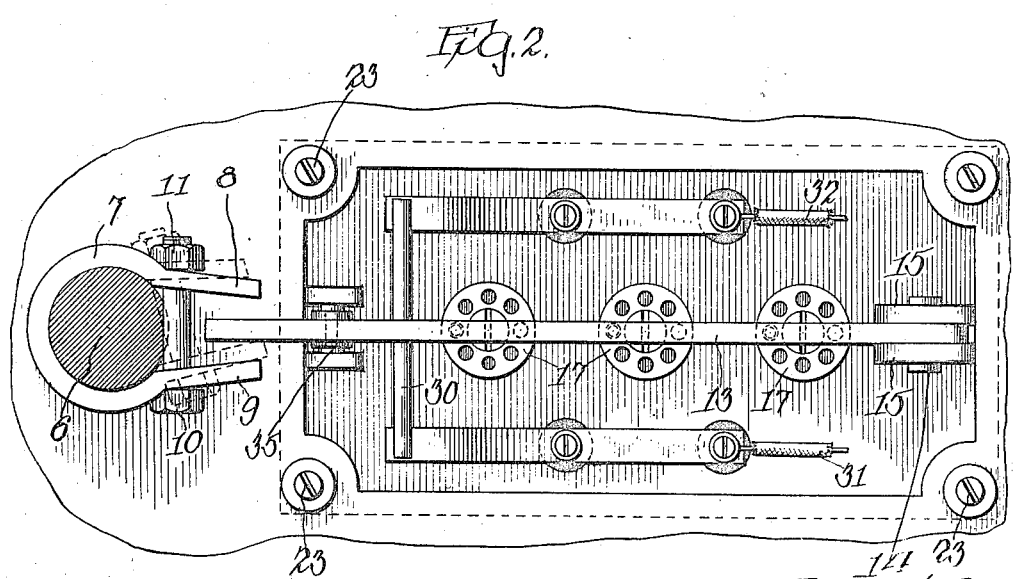

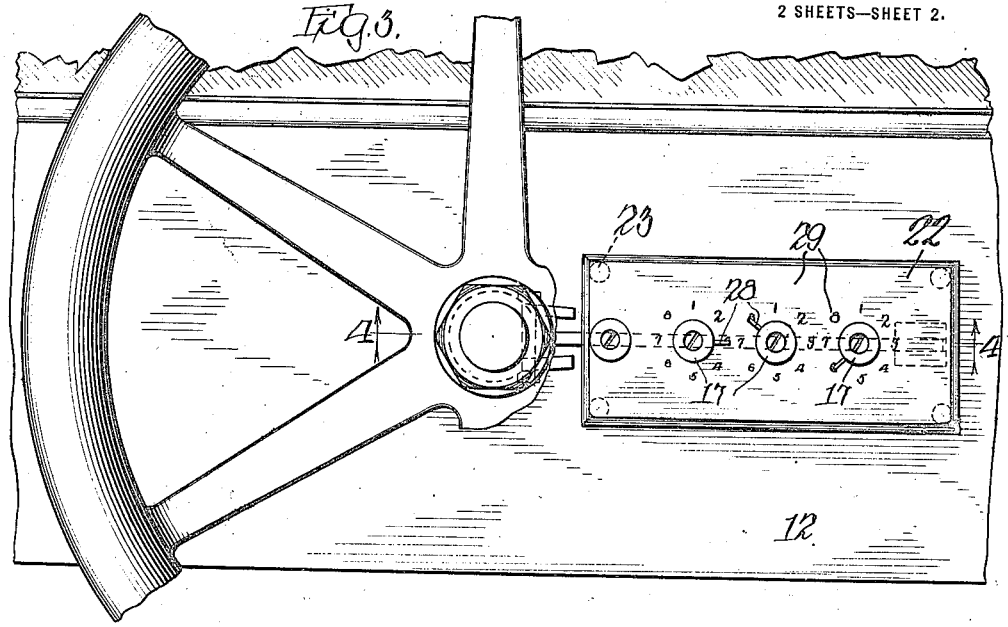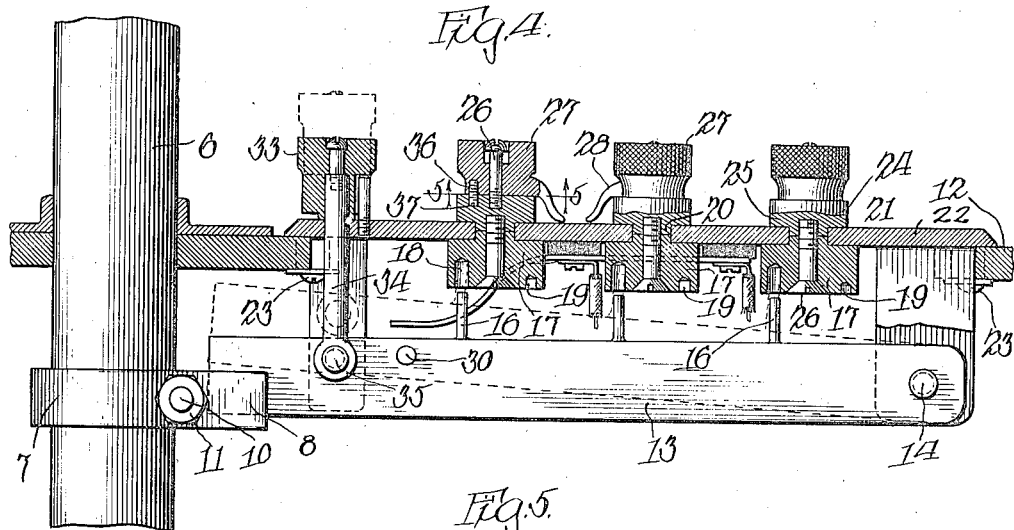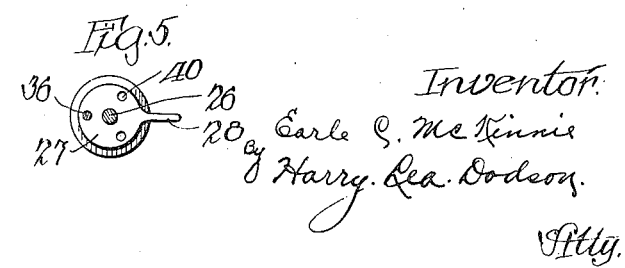

EARLE C. McKINNIE, OF CHICAGO, ILLINOIS.

LOCK FOR AUTOMOBILES.

1,326,149.  Specification of Letters Patent.  Patented Dec. 23, 1919.

Application filed February 21, 1917. Serial No. 149,985.

*To all whom it may concern:*

Be it known that I, EARLE C. MCKINNIE, a citizen of the United States, residing at Chicago, in the county of Cook and State of Illinois, have invented a certain new and useful Improvement in Locks for Automobiles, of which the following is a specification.

My invention relates to that class of devices which are designed to lock an automobile to prevent its theft.

Devices of this kind, with which I am familiar, are designed either to lock the ignition switch or to lock the steering wheel. Those which lock the steering wheel are objectionable because of the fact that it becomes impossible to get the machine out of the way in the event of fire or similar occurrences, where the curb is required and as a consequence many cities have passed ordinances prohibiting the locking of the steering post. The switch lock is objectionable due to the fact that those persons skilled enough to steal an automobile are quite capable of cutting the wires under the hood and making connection so as to dispense with the switch.

My invention has for its object to produce a lock which will not only lock the ignition, but will also lock the steering post by the same operation, so as to prevent the car being driven and yet will permit its being moved out or away from the curb in the event of necessity, and has for its further object the releasing of the steering post with the same operation which closes the electric circuit, and has for its further object to provide means to permit the automobile owner to change the combination without disturbing the interior mechanism of the locking device, and has for its further object to provide means for concealing the combination from people riding in the front seat of the automobile by making the three turning members on the dials in two sections, so that one part can be revolved independently of the other.

My means of accomplishing the foregoing objects may be more readily understood by having reference to the accompanying drawings, which are hereunto annexed and are a part of this specification, in which—

Figure 1 is a side elevation, partially in section of my improved device.

Fig. 2 is a view looking up from the bottom of Fig. 1.

Fig. 3 is a top or plan view.

Fig. 4 is a section taken on the line 4—4 in Fig. 3.

Fig. 5 is a detail view taken on the line 5—5 in Fig. 4.

Similar reference numerals refer to similar parts throughout the entire description.

As shown in the drawings, the steering post 6, of the automobile has fitted to it a collar 7, which is provided with two outwardly extending lugs 8 and 9, and is secured in place by means of a clamping bolt 10, the nut 11, serving to compress the collar against the post so as to prevent its rotation.

It may be found desirable to mill a keyway in the post to be engaged by the side of the clamping bolt 10.

Mounted upon the dash board 12, adjacent the steering post is a lock. As shown in the drawings, it is a combination lock, but it will be apparent that a key-lock can be used if desired. A detent 13, is pivotally mounted upon a pin or pivot 14, carried in supports 15, mounted upon a dash 12, in a suitable or convenient manner. This detent is provided with laterally projecting pins 16, in number corresponding to the number of dials 17, with which the combination lock is provided. These dials 17, are provided with recesses or holes 18, corresponding to the pins 16. They are also provided with a plurality of countersunk recesses 19, the use of which will be hereinafter explained. Each of the dials 17, is provided with a reduced neck or stem 20, which fits into a bearing 21, formed in a face plate 22, which is secured to the dash 12 by screws 23 or in any other suitable or convenient manner. The dial is held in position by means of a disk 24, which has a central neck or stem 25, corresponding to the neck or stem 20, on the dial 17, the two being held together by means of screws 26, or in any other suitable or convenient manner. Mounted upon the disk 25 is a knurled knob 27. This knob 27, is provided with a pointer 28, adapted to register with numerals 29, formed upon the face plate 22, around each of the dials. The screw 26, as clearly seen in Fig. 4 permits of a longitudinal movement of the knob 27, upon it, so that the dowel-pin 36, can be withdrawn from its socket 37, and the outer part of the knob 27, can be spun completely without affecting the dials. This effectually prevents the onlooker from getting the combination; at the same time the pin can be inserted into its hole during any rotation, then the rotation of the knob 27, will rotate the dials 17, and when the pointer is at the desired number, the recesses 18, will be opposite the laterally projecting pins 16.

The detent 13, is normally in the position shown in dotted lines in Fig. 4, when the electrical contact 30, which is connected to an electric circuit, by means of wires 31 and 32, will be closed. A knob 33, is provided adjacent one end of the detent 13, and is connected thereto by link 34, which is secured to the detent by means of a pin or pivot 35. When the dials are in the position just described, the knob 33, can be pulled out to the position shown by the dotted lines in Fig. 4, and this, through the medium of the link 34, raises the detent from between the lugs 8 and 9, thus freeing the steering post so that it can be rotated and at the same time closing the electrical circuit so that the ignition can be used.

When it is desired to lock the car, the knob 33, is pushed inwardly, until the detent 13, is in position between the two lugs 8 and 9, which effectually will prevent the steering post being turned sufficiently to permit the car to turn a corner, but it will be apparent that these lugs are far enough apart to permit a slight movement of he wheel. In other words, while the car cannot turn a corner, the wheels can be moved sufficiently to bring it to a curb or away from a curb as desired. I provide means whereby the combination can be changed whenever desired by the owner without disturbing the inner mechanism of the device. This I accomplish by removing the screw 26, when the dowel 36 can be removed and inserted into one of a number of recesses 40, formed on the inner face of the knurled knob 27, when it can be replaced, and the combination will be changed to that extent.

In order to prevent a person seeking to learn the combination from turning the dials and holding the laterally extending pins 16, against the base of them, and by feeling the pins enter the recesses 18, I provide a number of countersunk recesses 19, around the inner face of the dial and these of course will engage the pin as it is held against them, making it very difficult for anyone to discover the combination in this way.

Although I have described a specific form of device for my invention, it will be apparent that many changes can be made without deviating from the scope of the hereinafter contained claims, and I do not desire to limit myself to the precise construction shown in the drawings, which are furnished for illustrative purposes, and to show means for employing my improvement.

Having described my invention what I regard as new and desire to secure by Letters Patent is:

1. In a lock for automobiles, a collar having projections, means for attaching the collar to a steering post, a detent adapted to engage the projections of the collar, means for pivotally mounting the detent whereby it may be moved into and out of operative relation to the said projections, members extending from the detent, adjustable means with which the members engage to limit the movement of the detent, said means having recesses constituting clearances into which the members may project to permit movement of the detent when proper adjustment is attained, and means for operating the detent.

2. In a lock for automobiles, a collar having projections, means for attaching the collar to a steering post, a detent adapted to engage the projections of the collar, means for pivotally mounting the detent whereby it may be moved into and out of operative relation to the said projections, members extending from the detent, adjustable means with which the members engage to limit the movement of the detent, said means having recesses constituting clearances into which the members may project to permit movement of the detent when proper adjustment is attained, a member for rotatably supporting the means in operative relation to the members, means for determining the relation of the recesses to the members, and means for operating the detent.

3. In a lock for automobiles, a collar having projections, means for attaching the collar to a steering post, a detent adapted to engage the projections of the collar, means for pivotally mounting the detent whereby it may be moved into and out of operative relation to the said projections, members extending from the detent, adjustable means with which the members engage to limit the movement of the detent, the said means each having a recess constituting a clearance for a member, and depressions into which each member has limited movement, a member rotatably supporting the means in operative relation to the members, means for determining the relation of the recesses to the members, and means for operating the detent.

4. In a lock for automobiles, a collar having projections, means for attaching the collar to a steering post, a detent adapted to engage the projections of the collar, means for pivotally mounting the detent whereby it may be moved into and out of operative relation to the said projections, members extending from the detent, adjustable means with which the members engage to limit the movement of the detent, said means having recesses constituting clearances into which the members may project to permit movement of the detent when proper adjustment is attained, means for adjustably holding the indicating means of each recessed means with respect to said recessed means, and means for operating the detent.

5. In a lock for automobiles, a collar having projections, means for attaching the collar to a steering post, a detent adapted to engage the projections of the collar, means for pivotally mounting the detent whereby it may be moved into and out of operative relation to the said projections, members extending from the detent, adjustable means with which the members engage to limit the movement of the detent, said means having recesses constituting clearances into which the members may project to permit movement of the detent when proper adjustment is attained, a member for rotatably supporting the means in operative relation to the members, means for determining the relation of the recesses to the members, means for adjustably holding the indicating means of each recessed means with respect to the said recessed means, and means for operating the detent.

6. In a lock for automobiles, a collar having projections, means for attaching the collar to a steering post, a detent adapted to engage the projections of the collar, means for pivotally mounting the detent whereby it may be moved into and out of operative relation to the said projections, members extending from the detent, adjustable means with which the members engage to limit the movement of the detent, the said means each having a recess constituting a clearance for a member, depressions into which each member has limited movement, a member rotatably supporting the means in operative relation to the members, means for determining the relation of the recesses to the members, means for adjustably holding the indicating means of each recessed means with respect to said recessed means, and means for operating the detent.

In testimony whereof, I have signed the foregoing specification.

EARLE C. McKINNIE.